J. MOORE.
Potato-Planter.

No. 15,433. Patented July 29. 1856.

UNITED STATES PATENT OFFICE.

JOHN MOORE, OF QUINCY POINT, MASSACHUSETTS.

IMPROVEMENT IN POTATO-PLANTERS.

Specification forming part of Letters Patent No. 15,433, dated July 29, 1856.

*To all whom it may concern:*

Be it known that I, JOHN MOORE, of Quincy Point, in the county of Norfolk and State of Massachusetts, have invented an Improved Potato-Planter; and I do hereby declare that the same is fully described and represented in the following specification and the accompanying drawings, of which—

Figure 1:
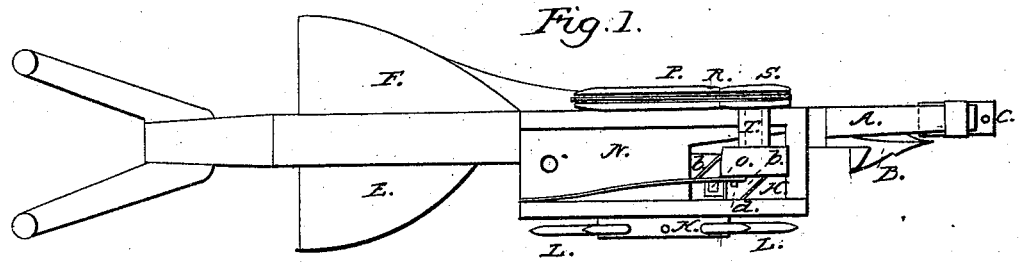
Figure 2:
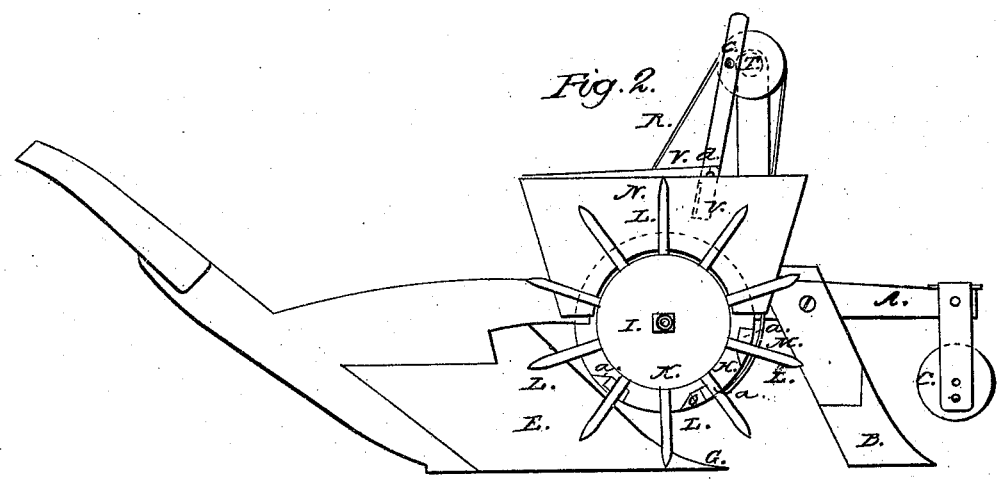
Figure 3:
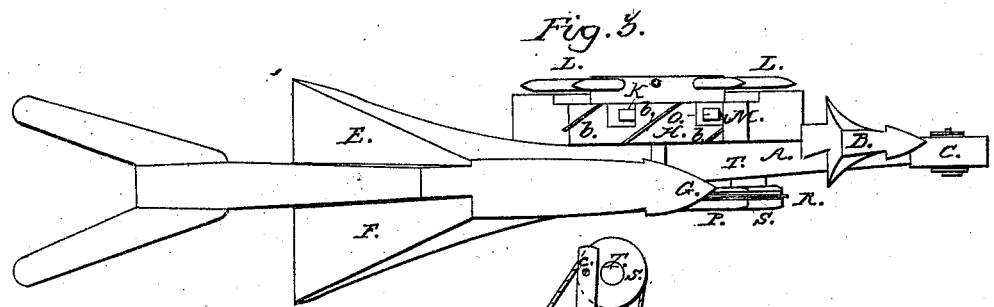
Figure 4:
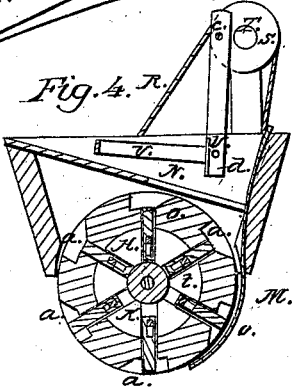

Figure 1 is a top view of said agricultural machine; Fig. 2, a side elevation of it; Fig. 3, an under side view of it; Fig. 4, a vertical section taken through the chambered cylinder, to be hereinafter described, such section being made to exhibit a series of gravitating dischargers applied to the chambers of such cylinder.

In the drawings, A exhibits a plow-beam, provided with a furrow-opener, B, extending down from it and in rear of a guide-wheel, C. In rear of said furrow-opener are what I term "covering mold-boards" E F, projecting from a common nose or point, G, and arranged on the plow-beam, as shown in the drawings.

Between the furrow-opener and the covering mold-boards, and placed against the side of the beam, is a chambered cylinder, H, fixed upon a horizontal shaft, I, which extends transversely across the beam and underneath it, and is supported so as to be capable of being revolved.

Extending from the hub K of the chambered cylinder is a series of pointed arms, L L L, which, when the machine is drawn forward over the surface of a piece of land, successively enter the ground, and thereby cause the chambered cylinder to be put in revolution. Such chambered cylinder is provided not only with a series of notches, recesses, or chambers, $a\ a\ a$, arranged in its circumference, but also with a series of scrapers, $b\ b\ b$, the latter being disposed helically on and made to project a short distance from the periphery of the cylinder, and to operate in conjunction with a metallic spring-guard, M, extending partially around and in front of the chambered cylinder H, and downward from a hopper, N, arranged over the chambered cylinder and on the beam A, as shown in the drawings. The cylinder H extends into the hopper, and each of its chambers or recesses $a\ a$ is provided with a gravitating weight or discharger, O, so applied to the cylinder as to be capable of dropping into the chamber whenever the chamber is approaching or is down in its lowest position, the object of such weight O being to prevent the pieces of potato from being clogged in said chamber.

Affixed on the shaft I, and outside of the hopper, is a pulley, P, about which an endless belt, R, extends and transmits motion to another grooved pulley, S, fixed upon a short shaft, T. (Shown in Fig. 1 by dotted lines.) A chopping-knife, U, is connected with the shaft T by a crank-pin, $e$, and is guided in its downward movements into the hopper by a connection-bar, V, which is jointed to it and turns vertically upon a pin, $d$, arranged as seen in Figs. 1 and 2. By means of such devices the knife during the rotary movements of the chambered cylinder will have a reciprocating motion imparted to it such as will cause it to cut or chop in pieces potatoes when they are placed in the hopper. After they are so cut the pieces thereof will be received within or will drop into the chamber of the cylinder and be carried around with such cylinder, and be discharged from each chamber thereof immediately after it may pass by the lower end of the spring-guard M. The scrapers on the periphery of the cylinder serve to carry downward any pieces which may adhere to the spring-guard.

It is well known by agriculturists that preparatory to planting potatoes it is customary to cut each one in pieces, so as to have an eye or sprout in each piece. The labor of so preparing the potatoes, as well as that of planting them, may be performed by my machine, which, while being drawn over the surface of the ground, will open a furrow, drop the pieces of potato at regular intervals apart in said furrow, and afterward, by the aid of one of its covering mold-boards—viz., that one immediately in rear of its chambered cylinder—will scrape into the furrow the earth which may have been thrown upon one side of it. When the next row or furrow is being planted the other covering-board serves to complete the covering of the first row.

I have contemplated making certain additions or improvements upon my machine. For instance, I may increase the number of its cutters or choppers and place a gage upon the beam and forward of the hopper, and so made as to mark out on the ground, when the machine is in use, the next or succeeding furrow, and this may be arranged and applied in any proper manner. I have also contemplated having the coverers applied to the beam so that the machine may be used for planting, while it may be moved either forward or backward on the field.

I do not claim a seed-planter wherein there is a furrow-opener, a contrivance for dropping the seed, and one for covering the furrow; but What I do claim is—

Arranging and combining with the chambered cylinder H and its spring-guard M, and so as to operate therewith, as set forth, a series of scrapers, $b\ b$, the same being for the purpose as specified.

In testimony whereof I have hereunto set my signature this 31st day of May, A. D. 1856.

JOHN MOORE.

Witnesses:
R. H. EDDY,
F. P. HALE, Jr.